(12) United States Patent
Yamaguchi et al.

(10) Patent No.: US 10,289,099 B2
(45) Date of Patent: May 14, 2019

(54) OPERATION ORDER SYSTEM

(71) Applicant: JTEKT CORPORATION, Osaka-shi (JP)

(72) Inventors: Yuji Yamaguchi, Toyokawa (JP); Kazuki Yoshikawa, Kariya (JP); Tomoyuki Nakagawa, Gamagori (JP); Toshio Aono, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 55 days.

(21) Appl. No.: 15/492,140

(22) Filed: Apr. 20, 2017

(65) Prior Publication Data

US 2017/0308065 A1 Oct. 26, 2017

(30) Foreign Application Priority Data

Apr. 26, 2016 (JP) .................................. 2016-088503

(51) Int. Cl.
*G05B 11/01* (2006.01)
*G05B 19/4155* (2006.01)
(Continued)

(52) U.S. Cl.
CPC ... *G05B 19/4155* (2013.01); *G05B 19/41865* (2013.01); *G06Q 10/063* (2013.01);
(Continued)

(58) Field of Classification Search
CPC .............................. E03B 7/02; G05B 19/4155
(Continued)

(56) References Cited

U.S. PATENT DOCUMENTS 3,780,695 A * 12/1973 Richard .................. G08B 5/00
116/202
6,801,820 B1 * 10/2004 Lilly ..................... G06Q 10/06
700/100
(Continued)

FOREIGN PATENT DOCUMENTS

JP 2002-312013 10/2002
JP 2002-366216 12/2002
(Continued)

*Primary Examiner* — Suresh Suryawanshi
(74) *Attorney, Agent, or Firm* — Oblon, McClelland, Maier & Neustadt, L.L.P.

(57) ABSTRACT

An operation order system includes a management apparatus that manages processing executed by a plurality of processing machines and operations performed on the processing machines by operators and that determines a next operation for each operator based on an operation state of the operator, and portable terminal that can be carried by the operator and via which the operator can input the operation state of the operator so that the portable terminal transmits the input operation state to the management apparatus through wireless communication, the portable terminal receives the next operation from the management apparatus through wireless communication and displays the received next operation. The portable terminal receives, as the operation state, operation start information or operation completion information input from the operator indicating that the operator has started or completed the operation at a home position in a facility.

5 Claims, 13 Drawing Sheets

(51) Int. Cl.
*G05B 19/418* (2006.01)
*G06Q 10/06* (2012.01)

(52) U.S. Cl.
CPC .............. *G05B 2219/31455* (2013.01); *G05B 2219/32211* (2013.01); *Y02P 90/18* (2015.11); *Y02P 90/20* (2015.11)

(58) Field of Classification Search
USPC .......................................................... 700/27
See application file for complete search history.

(56) References Cited

U.S. PATENT DOCUMENTS

| | | | |
|---|---|---|---|
| 7,962,235 B2 * | 6/2011 | Maida .............. | G05B 19/41805 29/430 |
| 8,854,323 B2 * | 10/2014 | Harada ............... | G06F 3/04883 345/156 |
| 2006/0031840 A1 * | 2/2006 | Yigit .................... | G06F 9/5088 718/102 |
| 2016/0012361 A1 * | 1/2016 | Sugiyama .......... | G06Q 10/0639 705/7.38 |

FOREIGN PATENT DOCUMENTS

| | | | |
|---|---|---|---|
| JP | 2003-311252 | | 11/2003 |
| JP | 2007141039 A | * | 6/2007 |
| JP | 2009289044 A | * | 12/2009 |
| JP | 2010191555 A | * | 9/2010 |
| JP | 2010-225058 | | 10/2010 |
| JP | 2010277546 A | * | 12/2010 |
| JP | 2015-191530 | | 11/2015 |

* cited by examiner

FIG. 7A

| OPERATION TYPE | | OPERATION CAPACITY | | | |
|---|---|---|---|---|---|
| | | OPERATOR | | | |
| | | Mr. A | Mr. B | Mr. C | Mr. D |
| SET-UP | MC1 | ○ | ○ | × | ○ |
| | MC2 | ○ | × | ○ | ○ |
| | MC3 | ○ | ○ | × | ○ |
| | MC4 | ○ | × | ○ | ○ |
| | MC5 | ○ | ○ | × | ○ |
| | MC6 | ○ | × | ○ | ○ |
| | MC7 | ○ | ○ | × | ○ |
| | MC8 | ○ | × | ○ | ○ |
| ABNORMAL RETURN | MC1 | ○ | ○ | × | × |
| | MC2 | ○ | × | ○ | × |
| | MC3 | ○ | ○ | × | × |
| | MC4 | ○ | × | ○ | × |
| | MC5 | ○ | ○ | × | × |
| | MC6 | ○ | × | ○ | × |
| | MC7 | ○ | ○ | × | × |
| | MC8 | ○ | × | ○ | × |

| OPERATION CAPACITY | | OPERATOR | | | |
|---|---|---|---|---|---|
| OPERATION TYPE | | Mr. A | Mr. B | Mr. C | Mr. D |
| SET-UP | MC1 | ○ | ○ | × | ○ |
| | MC2 | ○ | △ | ○ | ○ |
| | MC3 | ○ | ○ | × | ○ |
| | MC4 | ○ | × | ○ | ○ |
| | MC5 | ○ | ○ | △ | ○ |
| | MC6 | ○ | △ | ○ | ○ |
| | MC7 | ○ | ○ | △ | ○ |
| | MC8 | ○ | × | ○ | ○ |
| ABNORMAL RETURN | MC1 | ○ | ○ | × | △ |
| | MC2 | ○ | △ | ○ | × |
| | MC3 | ○ | ○ | × | △ |
| | MC4 | ○ | × | ○ | × |
| | MC5 | ○ | ○ | △ | × |
| | MC6 | ○ | △ | ○ | × |
| | MC7 | ○ | ○ | △ | × |
| | MC8 | ○ | × | ○ | × |

FIG. 10

| OPERATOR | OPERATION START INFORMATION | | OPERATION COMPLETION INFORMATION | | | OPERATION IN EXECUTION/ COMPLETION STATE |
|---|---|---|---|---|---|---|
| | TIME POINT OF INPUT OF OPERATION START | ESTIMATED TIME POINT OF HP OPERATION START | TIME POINT OF INPUT OF OPERATION COMPLETION | ESTIMATED TIME POINT OF HP OPERATION COMPLETION | PREDICTED TIME POINT OF HP OPERATION COMPLETION | |
| Mr. A | 23:03 | 23:03 | | | 23:35 | OPERATION IN EXECUTION |
| Mr. B | | | 23:10 | 23:15 | | COMPLETED |
| Mr. C | | | 22:57 | 22:57 | | COMPLETED |
| Mr. D | 22:59 | 23:05 | | | 23:40 | OPERATION IN EXECUTION |

↙ 59

OPERATION ORDER SYSTEM

INCORPORATION BY REFERENCE

The disclosure of Japanese Patent Application No. 2016-088503 filed on Apr. 26, 2016 including the specification, drawings and abstract, is incorporated herein by reference in its entirety.

BACKGROUND OF THE INVENTION

1. Field of the Invention

The invention relates to an operation order system.

2. Description of the Related Art

A system in a production facility that is provided with portable terminals carried by operators is described in Japanese Patent Application Publication No. 2015-191530 (JP 2015-191530 A), Japanese Patent Application Publication No. 2010-225058 (JP 2010-225058 A), Japanese Patent Application Publication No. 2003-311252 (JP 2003-311252 A), Japanese Patent Application Publication No. 2002-366216 (JP 2002-366216 A), and Japanese Patent Application Publication No. 2002-312013 (JP 2002-312013 A). In the system, a management apparatus transmits contents of operation orders to the portable terminals so that the operators can check the contents of the operation orders on the portable terminals. In addition, the portable terminal transmits completion information to the management apparatus based on the operation for operation completion by the operator.

In a facility including a plurality of processing machines, for example, machine tools or industrial robots, a distance to the position of a processing machine on which the next operation is performed varies depending on the current position of the operator. A situation is assumed where a plurality of operators is responsible for the facility. Then, a first operator completes a previous operation and gets ready to start a next operation, and a second operator completes the previous operation a little late and gets ready to start a next operation.

Suppose the distance from the current position of the first operator to the position of a first processing machine for the next operation is long, and the distance from the current position of the second operator to the position of the first processing machine for the next operation is short. In this case, indicating the next operation on the first processing machine to the second operator may be more efficient than indicating the same operation to the first operator. However, the related art fails to take this into account, and thus, more efficient operation orders are desirably given.

SUMMARY OF THE INVENTION

An object of the invention is to provide an operation order system that enables more efficient operation orders.

An operation order system in an aspect of the invention is directed to a facility including a plurality of processing machines and giving operation orders to an operator handling the processing machines. The operation order system includes a management apparatus that manages processing executed by the processing machines and operations performed by the operator handling the processing machines and that determines a next operation for the operator based on an operation state of the operator, and a portable terminal that is enabled to be carried by the operator and via which the operator is enabled to input the operation state of the operator so that the portable terminal transmits the input operation state to the management apparatus through wireless communication, the portable terminal receiving the next operation from the management apparatus through wireless communication and displaying the received next operation. The portable terminal transmits, as the operation state, operation start information or operation completion information input by the operator, on the assumption that the operator has started or completed the operation at a predetermined home position in the facility.

In the operation order system in the above-described aspect, when the operator inputs operation start information or operation completion information, determination of start or completion of the operation is not based on a position where the portable terminal is present, that is, a position where the operator is present. In other words, when the operator inputs the operation start information or the operation completion information via the portable terminal, the management apparatus estimates an operation start state or an operation completion state with reference to a home position rather than with reference to the position where the portable terminal is present. In other words, when the operator is located away from the home position, the operation is determined to have been started and completed later than the time point of the input via the portable terminal. Therefore, more efficient operation orders can be achieved depending on the position of the operator.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7A is a diagram illustrating a first example of operation capacities of operators stored in a capacity database in FIG. 4;

FIG. 7B is a diagram illustrating a second example of the operation capacities of the operators stored in the capacity database in FIG. 4;

FIG. 10 is a diagram illustrating information acquired by an all-operator state acquiring unit.

DETAILED DESCRIPTION OF EMBODIMENTS

A configuration of a facility 1 serving as an operation order system in an embodiment of the invention will be described with reference to FIG. 1. The operation order system gives an operation order to each of a plurality of operators handling a plurality of processing machines MC1 to MC8. The intended facility 1 is, for example, a production facility that produces various objects or a distribution facility that transfers objects. In the present embodiment, the facility 1 is a production facility for machining by way of example. The facility 1 is a non-fully automated facility in which operators need to be involved. In other words, not all the processes for the processing machines MC1 to MC8 included in the facility 1 are automated and the operators need to perform operations for handling the processing machines MC1 to MC8.

Figure 1:
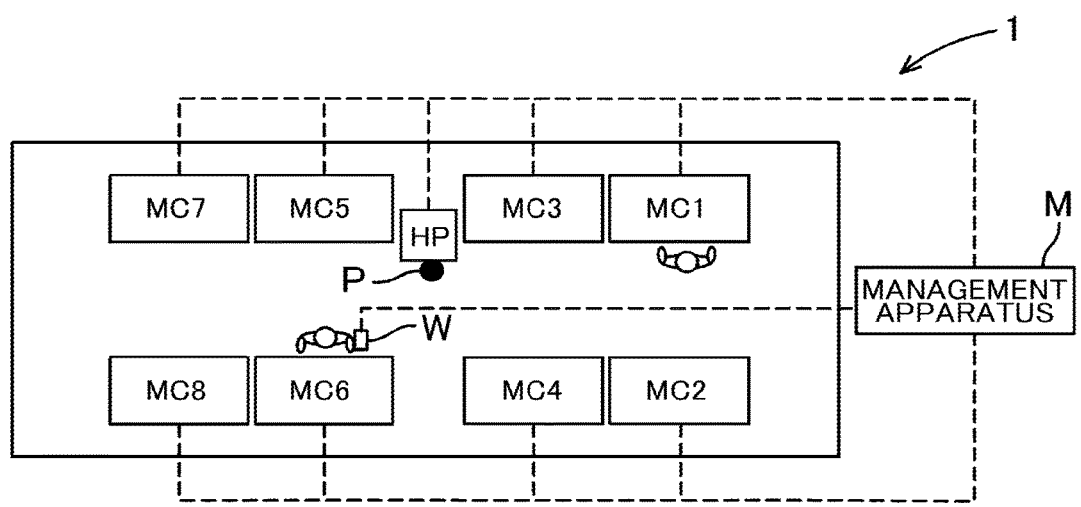
FIG. 1 is a layout drawing of a facility in the present embodiment.

As depicted in FIG. 1, the facility 1 includes eight processing machines MC1 to MC8, a home terminal HP, a plurality of portable terminals W, and a management apparatus M. Objects of production are, for example, cylindrical members.

The processing machines MC1 to MC8 are, for example, machine tools such as machining centers, lathes, or grinding machines, and the order of the processing machines MC1 to MC8 corresponds to the order of process steps. The processing machines MC1 to MC8 are arranged in two rows such that front surfaces of the processing machines in one of the two rows face front surfaces of the processing machines in the other row.

The processing machines MC1 to MC8 are a lathe for roughing of an external shape, a grinding machine for semi finishing of the external shape, a lathe for roughing of an internal shape, a grinding machine for semi finishing of the internal shape, a grinding machine for finishing of straight portions of the external shape, a grinding machine for finishing of tapered portions of the external shape, a grinding machine for finishing of straight portions of the internal shape, and a grinding machine for finishing of tapered portions of the internal shape, in order.

The home terminal HP is installed at a home position P in the facility 1. The home position P is a reference position in the facility 1 that is defined for operational reasons. The home terminal HP is an apparatus that gives operation orders to operators and that executes input processing for operation start information and operation completion information input by the operators. Each of the operators executes input processing on the home terminal HP each time an operation is started and completed. Thus, in regard to a travel distance of each operator, the home position P where the home terminal HP is installed is in the vicinity of the center of the entire facility 1. The home position P where the home terminal HP is installed is not limited to the vicinity of the center of the facility 1 but is determined as needed depending on the arrangement of the processing machines MC1 to MC8 included in the facility 1.

Each of the portable terminals W is a terminal that has functions similar to the functions of the home terminal HP and that can be carried by the corresponding operator. In other words, the portable terminal W is an apparatus configured to give operation orders to the operator and to allow the operator to execute the input processing for the operation start information and the operation completion information. The portable terminal W may be of a handy type or a wearable type. Examples of the handy type include non-wearable devices such as a tablet, a cellular phone, and a smart phone. Examples of the wearable type include an arm band type, a spectacle type, an earphone type, and a helmet attachment type.

Since the home terminal HP and the portable terminal W have similar functions, one of the home terminal HP and the portable terminal W may be selectively used. When both the home terminal HP and the portable terminal W are used, for example, unskilled operators may exclusively use the home terminal HP, whereas skilled operators may use both the home terminal HP and the portable terminal W. As described below, when the portable terminals W are used, an operation time that is an operation capacity is estimated, precluding the operation capacity of each operator from being accurately determined. Thus, it is recommended to allow the operators to use the portable terminals W when the operators' operation capacities are stable to some degree, that is, when the operators become skilled.

The management apparatus M manages processing executed by the processing machines MC1 to MC8 and operations performed on the processing machines MC1 to MC8 by the operators. Specifically, the management apparatus M has a function to determine operating performances, a function to create an update process plan, and a function to indicate a next operation to the operator. The management apparatus M is connected to the processing machines MC1 to MC8 and the home terminal HP via a wired or wireless communication network. The management apparatus M is connected to the portable terminals W via a wireless communication network.

Figure 2:
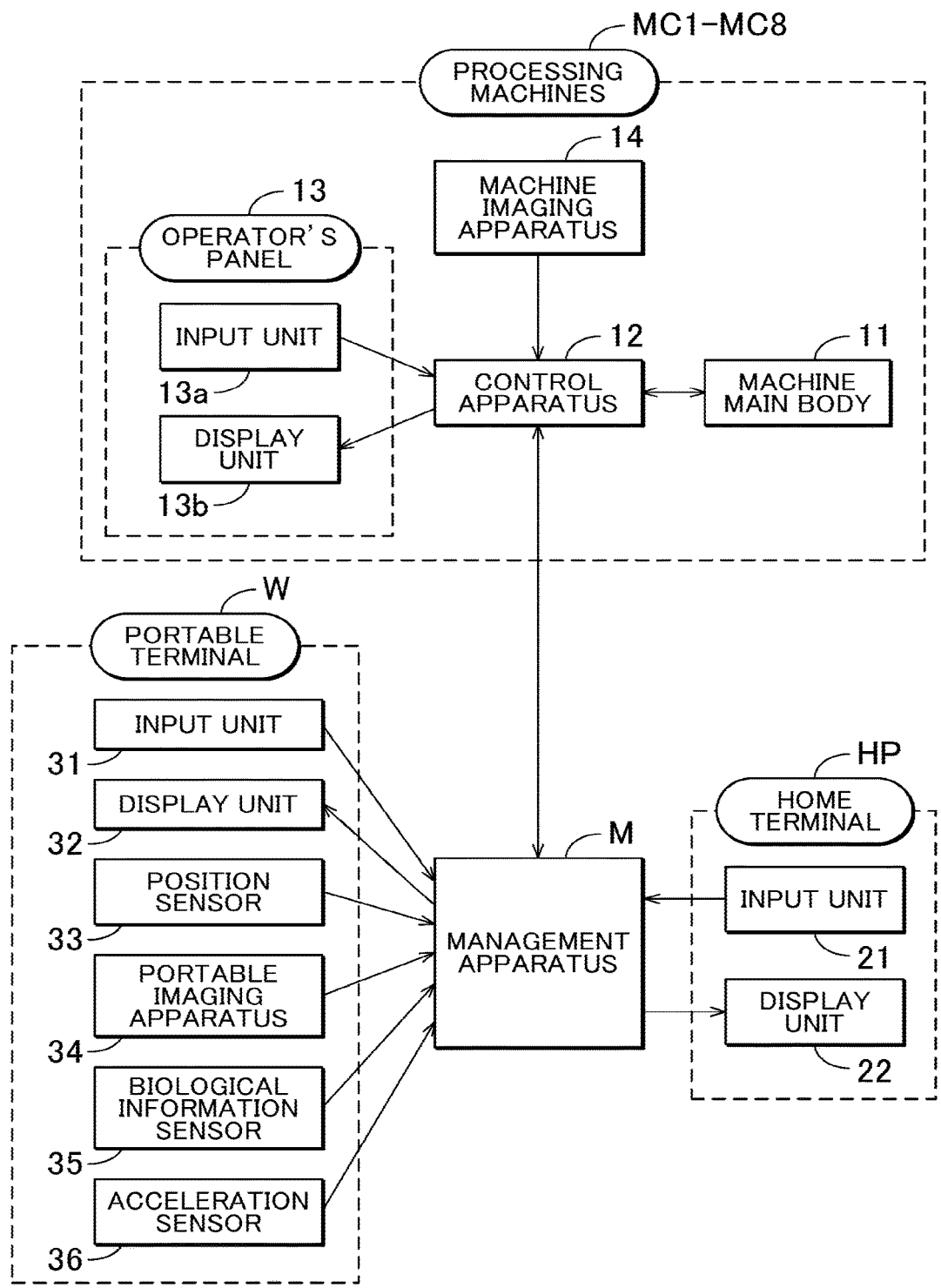
FIG. 2 is a diagram illustrating an internal configuration of the facility.

Now, internal configurations of the processing machines MC1 to MC8, the home terminal HP, and the portable terminals W will be described with reference to FIG. 2.

Each of the processing machines MC1 to MC8 includes a machine main body 11, a control apparatus 12, an operator's panel 13, and a machine imaging apparatus 14. The operator's panel 13 includes an input unit 13a and a display unit 13b. The machine imaging apparatus 14 images a periphery of each of the processing machines MC1 to MC8 and particularly performs imaging to acquire motion information on the operators.

The home terminal HP includes an input unit 21 and a display unit 22. Each of the portable terminals W includes an input unit 31, a display unit 32, a position sensor 33, a portable imaging apparatus 34, a biological information sensor 35, and an acceleration sensor 36. The position sensor 33 of the portable terminal W allows the position of the portable terminal W itself in the facility 1 to be recognized, and is, for example, a GPS sensor. The portable imaging apparatus 34 performs imaging to acquire field-of-view information for the operator. The biological information sensor 35 detects the operator's pulse wave and respiratory wave. The acceleration sensor 36 detects a signal corresponding to the operator's motion (for example, a walking state or a standing state).

The input unit 13a of the operator's panel 13, the input unit 21 of the home terminal HP, and the input unit 31 of the portable terminal W are each, for example, a touch panel via which information can be input by touch operation or mechanical buttons.

The operator's panel 13, the home terminal HP, and the portable terminal W are apparatuses that give instructions to the operator and via which the operator inputs information and are thus hereinafter collectively referred to as operator terminals 13, HP, W. A configuration of each of the operator terminals 13, HP, W will be described with reference to FIG. 3A and FIG. 3B.

Figure 3A:
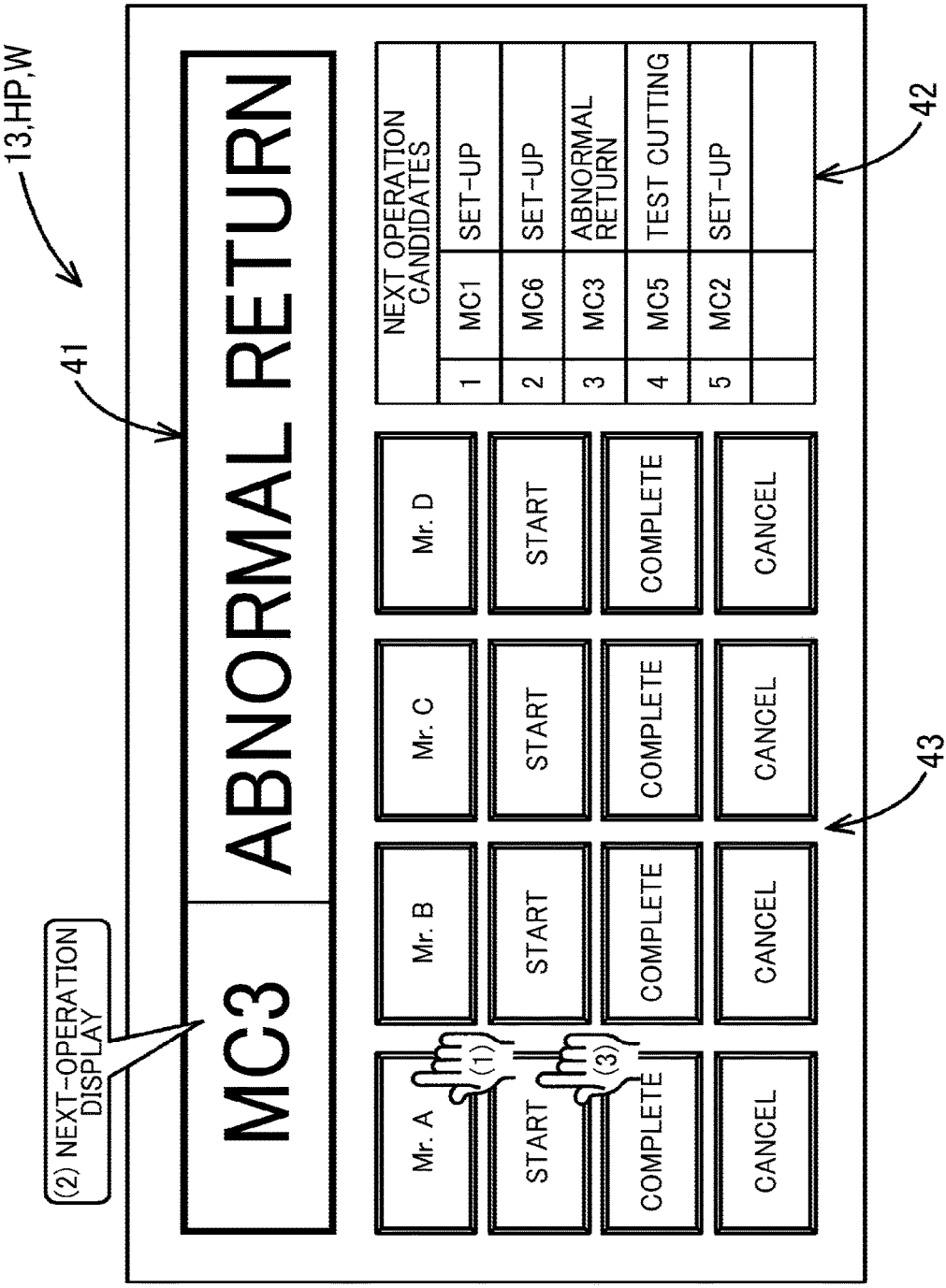
FIG. 3A is a diagram illustrating an operational procedure and display contents provided on an operator terminal (a home terminal, a portable terminal, or an operator's panel) at the time when an operation is started.
Figure 3B:
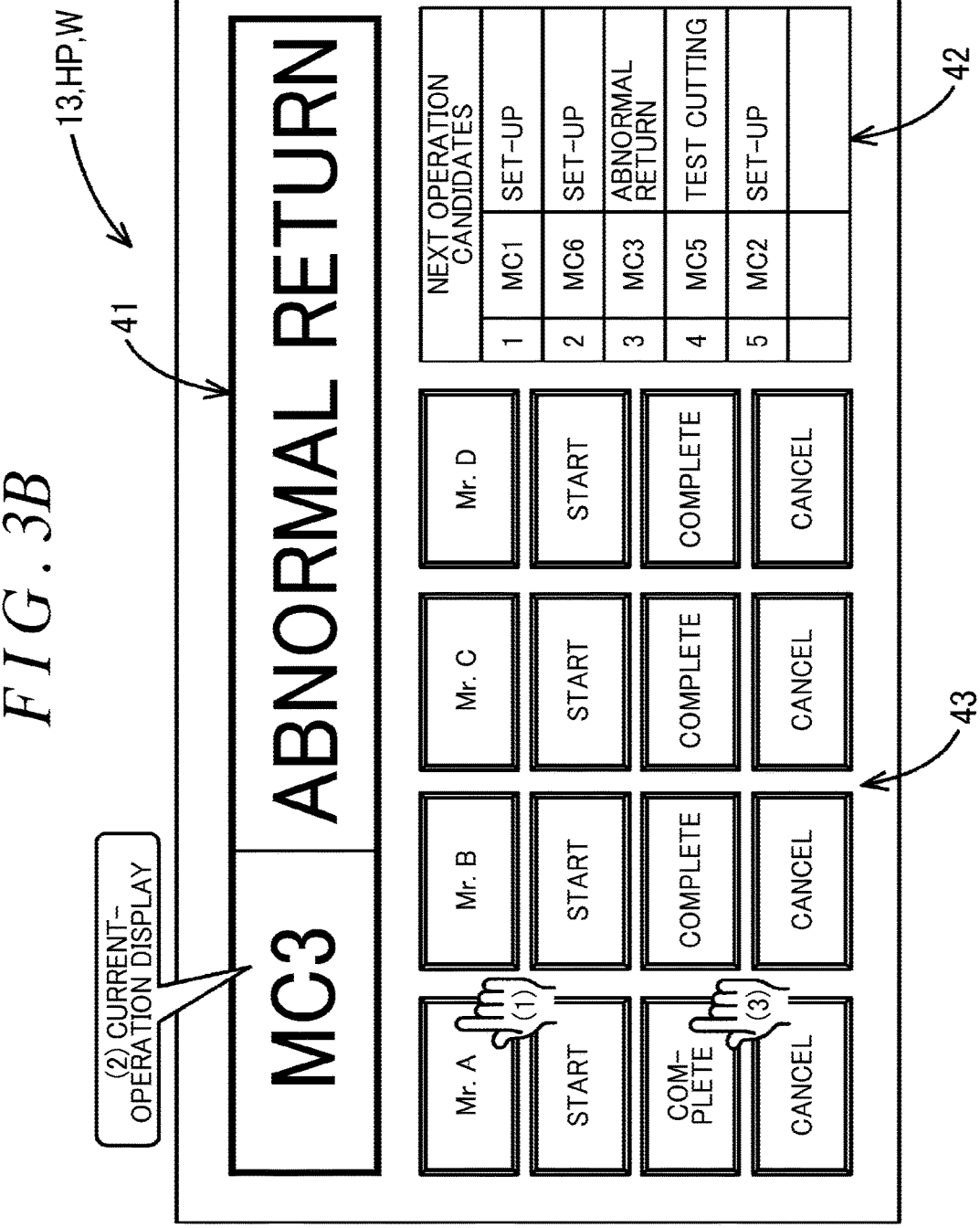
FIG. 3B is a diagram illustrating an operational procedure and display contents provided on the operator terminal (the home terminal, the portable terminal, or the operator's panel) at the time when the operation is completed.

As depicted in FIG. 3A and FIG. 3B, each of the operator terminals 13, HP, W includes an operation display section 41 configured to display a next operation or a current operation, a candidate section 42 configured to display a list of candidates for the next operation, and an input section 43 that displays operator name buttons, and an operation start button, an operation complete button, and a cancel button for each operator.

The operation display section 41 describes one of the processing machines MC1 to MC8 on which the operator operates and an operation type. The operation display section 41 further functions as a section that indicates the next operation to the operator who is ready to start the next operation as depicted in FIG. 3A and as a section that displays the current operation to the operator who is ready to execute completion processing for the current operation as depicted in FIG. 3B.

The candidate section 42 displays an operation that can be executed by the operator (hereinafter referred to as a next operation candidate), and indicates the processing machines MC1 to MC8 on which the operator operates and the operation type. The candidate section 42 further displays priorities when a plurality of next operation candidates is displayed.

Now, an operational procedure executed by each operator when the operator starts the next operation will be described with reference to FIG. 3A. The candidate section 42 of each of the operator terminals 13, HP, W constantly displays next operation candidates that can be currently executed. The operator who is not currently performing an operation touches the operator name button indicating his/her name on the operator terminal 13, HP, W (depicted at (1) in FIG. 3A). Then, the operation display section 41 of the operator terminal 13, HP, W displays a next operation (depicted at (2) in FIG. 3A). This next operation is one of the next operation candidates displayed in the candidate section 42. In other words, the operator receives the indication of the next operation on the operator terminal 13, HP, W. The operator subsequently touches the start button (depicted at (3) in FIG. 3A) to set about the indicated next operation.

Now, an operational procedure executed by each operator when the operator completes the current operation will be described with reference to FIG. 3B. Upon completing the operation on one of the processing machines MC1 to MC8, the operator touches the operator name button indicating his/her name on the operator terminal 13, HP, W (depicted at (1) in FIG. 3B). Then, the operation display section 41 of the operator terminal 13, HP, W displays the currently performed operation (depicted at (2) in FIG. 3B). In other words, the operator can confirm the currently performed operation in the operation display section 41. The operator subsequently completes the currently performed operation by touching the complete button (depicted at (3) in FIG. 3B) or in accordance with, for example, a signal from the corresponding one of the processing machines MC1 to MC8.

Figure 4:
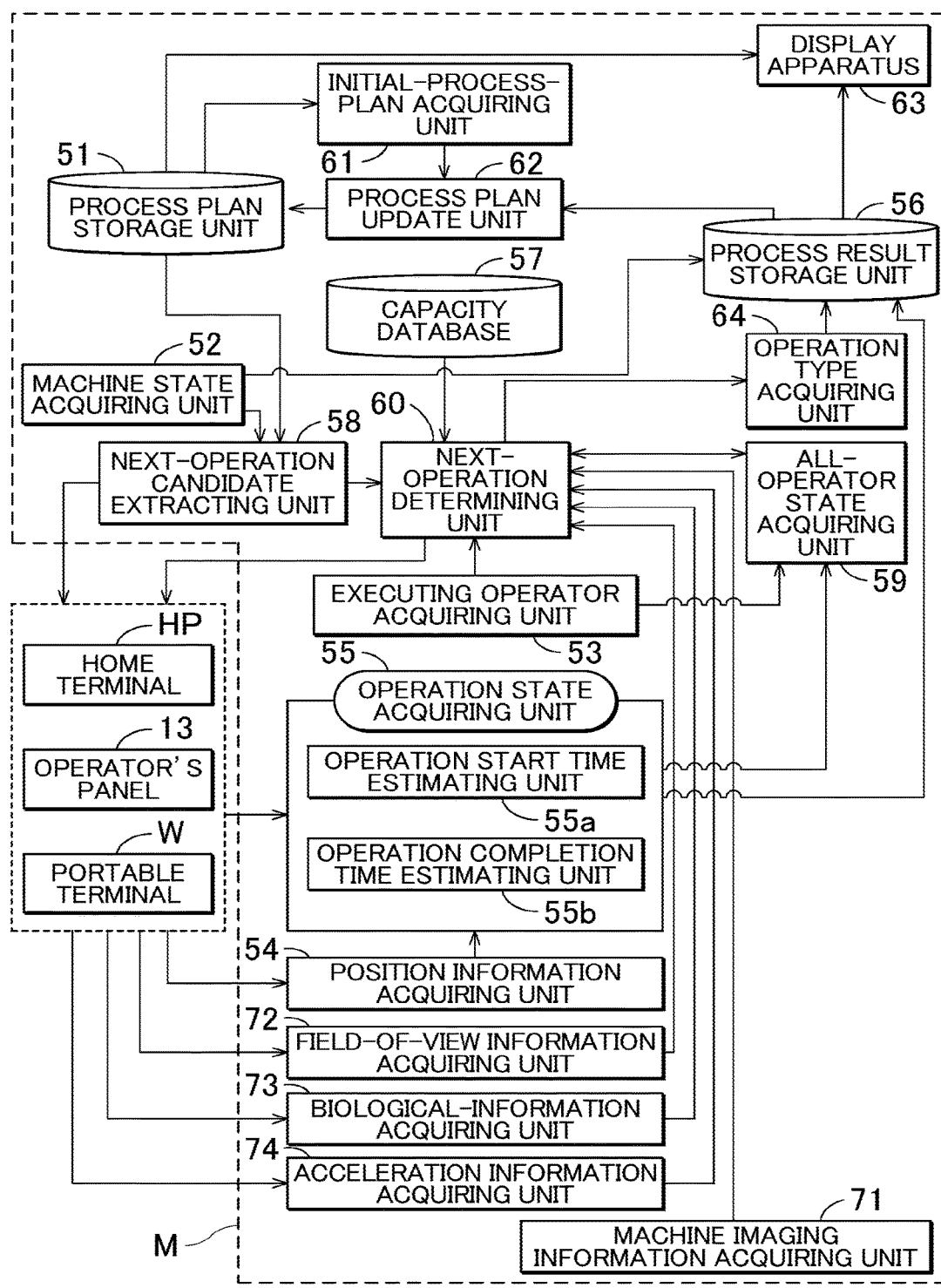
FIG. 4 is a diagram illustrating a management apparatus illustrated in FIG. 1 and FIG. 2.

Now, the management apparatus M will be described in brief with reference to FIG. 4. As depicted in FIG. 4, the management apparatus M includes the process plan storage unit 51, a machine state acquiring unit 52, an executing operator acquiring unit 53, a position information acquiring unit 54, an operation state acquiring unit 55, a process result storage unit 56, a capacity database 57, a next-operation candidate extracting unit 58, an all-operator state acquiring unit 59, a next-operation determining unit 60, an initial-process-plan acquiring unit 61, a process plan update unit 62, a display apparatus 63, an operation type acquiring unit 64, a machine imaging information acquiring unit 71, a field-of-view information acquiring unit 72, a biological-information acquiring unit 73, and an acceleration information acquiring unit 74.

The machine state acquiring unit 52, one of the units of the management apparatus M, acquires information on the current conditions (operating conditions) of the processing machines MC1 to MC8 from the control apparatus 12 of the processing machines MC1 to MC8. The machine imaging information acquiring unit 71 acquires information resulting from imaging by the machine imaging apparatus 14 of each of the processing machines MC1 to MC8. Information on the executing operator, information on the position, and information on the operation state of the operator are acquired via the operator terminals 13, HP, W by the executing operator acquiring unit 53, the position information acquiring unit 54, the operation state acquiring unit 55, the field-of-view information acquiring unit 72, the biological-information acquiring unit 73, and the acceleration information acquiring unit 74.

The executing operator acquiring unit 53 acquires, as an executing operator, information on the operator corresponding to the touched operator name button on the operator terminal 13, HP, W. In other words, the executing operator acquiring unit 53 acquires ID information (the operator's name or the like) on the operator executing the operation. The other units of the management apparatus M execute processing in the management apparatus M and will be described below in detail.

The management apparatus M has the function to determine operating performances, the function to create an update process plan, and the function to indicate the next operation to the operator as described above. The function to determine operating performances includes the process plan storage unit 51, the machine state acquiring unit 52, the operation state acquiring unit 55, the process result storage unit 56, the display apparatus 63, and the operation type acquiring unit 64.

The function to create an update process plan includes the process plan storage unit 51, the process result storage unit 56, the initial-process-plan acquiring unit 61, and the process plan update unit 62. The function to indicate the next operation to the operator includes the process plan storage unit 51, the machine state acquiring unit 52, the executing operator acquiring unit 53, the position information acquiring unit 54, the operation state acquiring unit 55, the capacity database 57, the next-operation candidate extracting unit 58, the all-operator state acquiring unit 59, the next-operation determining unit 60, the machine imaging information acquiring unit 71, the field-of-view information acquiring unit 72, the biological-information acquiring unit 73, and the acceleration information acquiring unit 74.

The function to determine operating performances, which function is provided by the management apparatus M, will be described with reference to FIG. 4 and FIG. 5. First, an initial process plan, process performances, and an update process plan that are used for the function to determine operating performances will be described with reference to FIG. 5.

Figure 5:
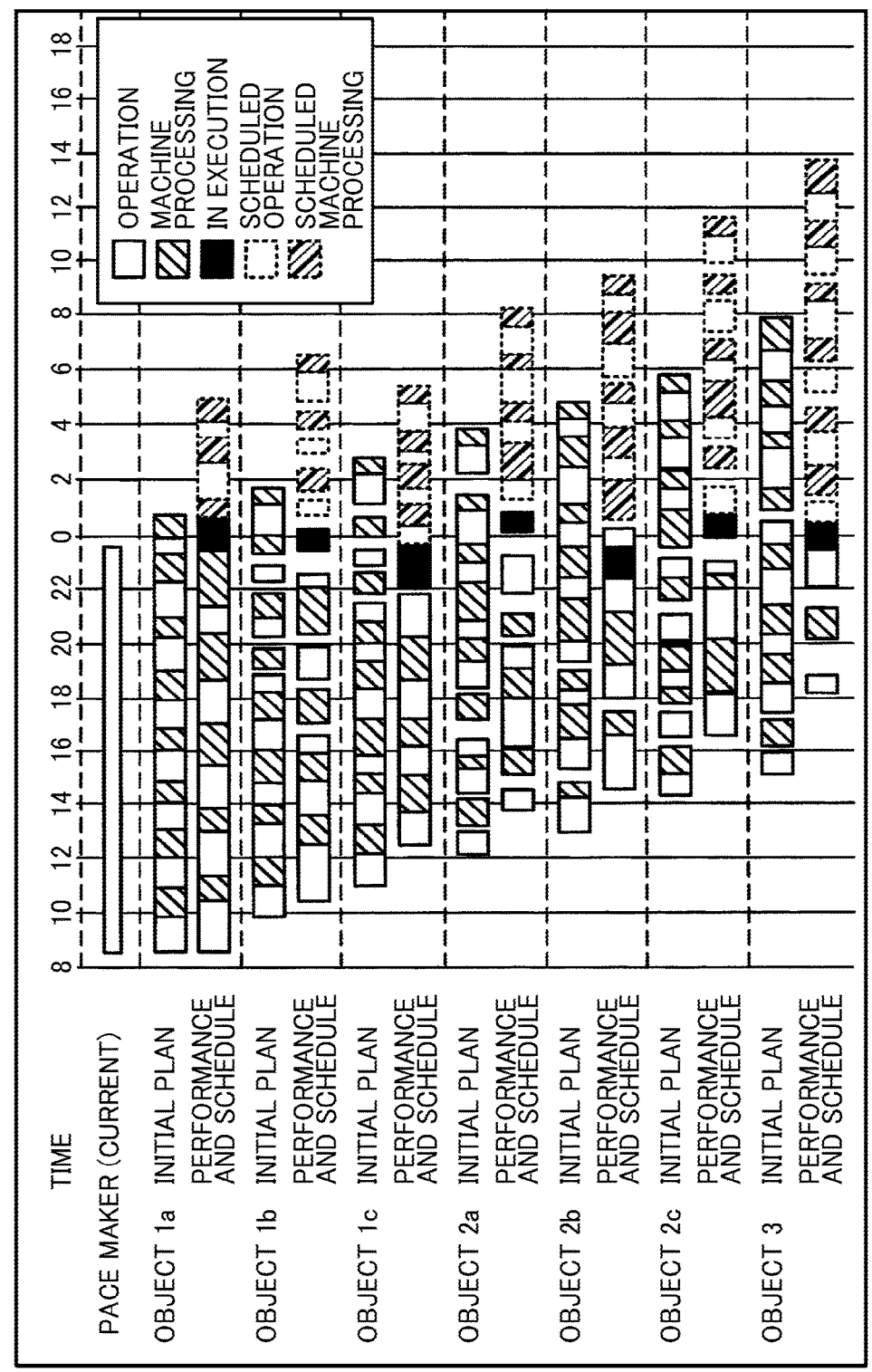
FIG. 5 is a diagram illustrating contents displayed on a display apparatus in FIG. 4 and including an initial process plan, process performances, and an update process plan (schedule plan)

FIG. 5 illustrates the contents displayed on the display apparatus 63. FIG. 5 illustrates a pace maker that indicates the current time point, the initial process plan for each object stored in the process plan storage unit 51, the update process plan for each object stored in the process plan storage unit 51, and the process performances for each object stored in the process result storage unit 56. Objects 1a, 1b, 1c are of the same type, and objects 2a, 2b, 2c are of the same type. The objects are production objects (workpieces, assemblies, or the like) in a production facility or distribution objects (conveyed articles) in a distribution facility. The set of objects 1a, 1b, 1c, the set of objects 2a, 2b, 2c, and the object 3 are of types different from one another.

The process plan defines the order of execution of the processes executed by the processing machines MC1 to MC8 and the operations performed on the processing machines by the operators. Initial process plans and update process plans are stored in the process plan storage unit 51. Each initial process plan is predetermined by a manager based on a production plan for the corresponding object. The initial process plan is a process plan set based on an operation time for an operator with a standard operation capacity. Each update process plan is a process plan resulting from update of the initial process plan in accordance with operating performances for the processing machines and operational achievements of the operators. The process performances represent processing performances of the processing machines MC1 to MC8 and the operational achievements of the operators. The process performances are stored in the process result storage unit 56.

In FIG. 5, the display on the pace maker indicates that the current time point is around 23:30. The initial process plans are displayed in initial process plan sections for the respective objects in FIG. 5. In the initial process plan section, blank continuous-line frames indicate operations performed by the operators, and hatched continuous-line frames indicate processing executed by the processing machines MC1 to MC8.

The process performances are indicated by blank continuous-line frames and hatched continuous-line frames in performances and schedule sections for the respective objects in FIG. 5. In the performances and schedule sections, the blank continuous-line frames represent the operational achievements of the operators, and the hatched continuous-line frames represent processing performances of the processing machines MC1 to MC8. The update process plans are indicated by blank dashed-line frames and hatched dashed-line frames in the performances and schedule sections for the respective objects in FIG. 5. The blank dashed-line frames represent scheduled operations performed by the operators, and the hatched dashed-line frames represent scheduled processing executed by the processing machines MC1 to MC8. In FIG. 5, the filled rectangles represent processing currently executed by the processing machines MC1 to MC8 or operations currently performed by the operators. Gaps between the frames represent time periods when no processing is executed by the processing machines MC1 to MC8 and no operation is performed by the operators.

The process result storage unit 56 stores the processing performances of the processing machines MC1 to MC8 and the operational achievements of the operators. The processing performances of the processing machines MC1 to MC8 are information acquired by the machine state acquiring unit 52. The machine state acquiring unit 52 acquires the current conditions (operating conditions) of the processing machines MC1 to MC8 from the control apparatuses 12 of the processing machines MC1 to MC8.

The operational achievements of the operators are information acquired by the operation state acquiring unit 55 and the operation type acquiring unit 64. The operation state acquiring unit 55 acquires, as an operational performance, information on an operation state of each operator. The information on the operation state of the operator includes operation start time point, operation completion time point, and information indicative of an in-operation state or an operation completion state.

The operation type acquiring unit 64 acquires, as another operational performance, the type of the operation performed by each operator. The operation type acquiring unit 64 acquires the operation type by acquiring the next operation determined by the next-operation determining unit 60 described below. Processing executed by the operation state acquiring unit 55 and processing executed by the next-operation determining unit 60 will be described below in detail.

Now, the function to create an update process plan, which function is provided by the management apparatus M, will be described with reference to FIGS. 4 to 6. The function to create an update process plan includes the process plan storage unit 51, the process result storage unit 56, the initial-process-plan acquiring unit 61, and the process plan update unit 62.

The initial-process-plan acquiring unit 61 acquires one of the initial process plans stored in the process plan storage unit 51. The process plan update unit 62 creates an update process plan as illustrated by dashed-line frames in FIG. 5, based on the initial process plan acquired by the initial-process-plan acquiring unit 61 and the process performances stored in the process result storage unit 56.

Figure 6:
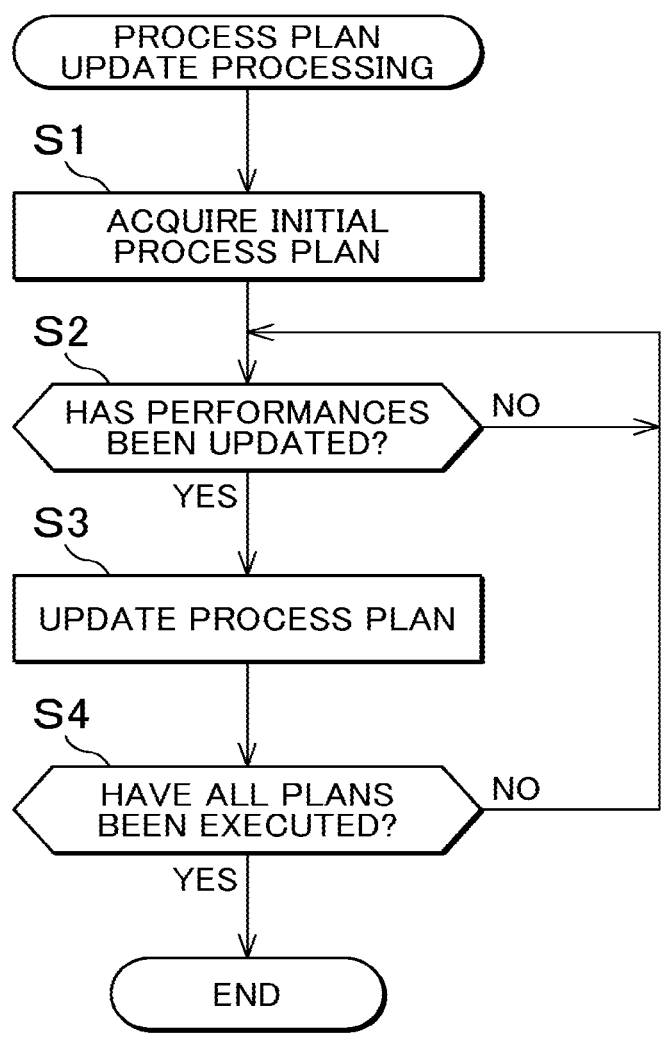
FIG. 6 is a flowchart illustrating processing executed by a process plan update unit.

Specifically, the processing executed by the process plan update unit 62 is as illustrated in FIG. 6. The update unit 62 acquires the initial process plan from the initial-process-plan acquiring unit 61 (S1). The update unit 62 subsequently determines whether the performances stored in the process result storage unit 56 have been updated (S2). If the performances have not been updated, the update unit 62 repeats the determination processing until the performances are updated (S2: No).

If the performances have been updated, the update unit 62 updates the process plan based on the process performances (S3). The update unit 62 subsequently determines whether or not all of the process plan has been executed, and if not, the update unit 62 returns to S2 to repeat the processing (S4: No). If all of the process plan has been executed (S4: Yes), the update unit 62 ends the processing.

In other words, if the process performances indicate a delay with respect to the initial process plan, the process plan update unit 62 determines a future process plan taking the delay into account. At this time, the operation time for each operator is set based on the operation time for an operator with a standard operation capacity.

Now, with reference to FIG. 7A and FIG. 7B, the capacity database 57 will be described, which is used for the function to indicate the next operation to the operator, which function is provided by the management apparatus M. FIG. 7A illustrates the capacity database 57 in a first example. FIG. 7B illustrates the capacity database 57 in a second example.

The capacity database 57 stores the operation capacity for each of a plurality of operators and for each of a plurality of operation types. The operation types include, for example, set-up, test machining, and abnormal-return processing. The above-described information is stored in each of the processing machines MC1 to MC8.

As depicted in FIG. 7A, the capacity database 57 in the first example has information indicating whether or not each operator can perform the corresponding type of operation. In FIG. 7A, each circle indicates that the operator can perform the corresponding type of operation. Each cross indicates that the operator cannot perform the corresponding type of operation. An operator A can perform all the types of operations, whereas operators B, C, D can perform only some types of operations.

As depicted in FIG. 7B, the capacity database 57 in the second example contains information indicating whether each operator can perform the corresponding type of operation, and a proficiency level if the operator can perform the corresponding type of operation. For example, if the operator can perform the corresponding type of operation, the capacity database 57 indicates, as a proficiency level, whether each operator has a standard or higher capacity or fails to have the standard capacity. In FIG. 7B, each circle indicates that the operator has the standard or higher capacity, each triangle indicates that the operator fails to have the standard capacity, and each cross indicates that the operator cannot perform the corresponding type of operation.

With reference to FIG. 3A, FIG. 3B, FIG. 8, and FIG. 9, processing will be described which is executed by the operation state acquiring unit 55 and used for the function to indicate the next operation to the operator and the function to determine the operation state, which functions are provided by the management apparatus M. The operation state acquiring unit 55 includes an operation start time point estimating unit 55a and an operation completion time point estimating unit 55b.

Figure 8:
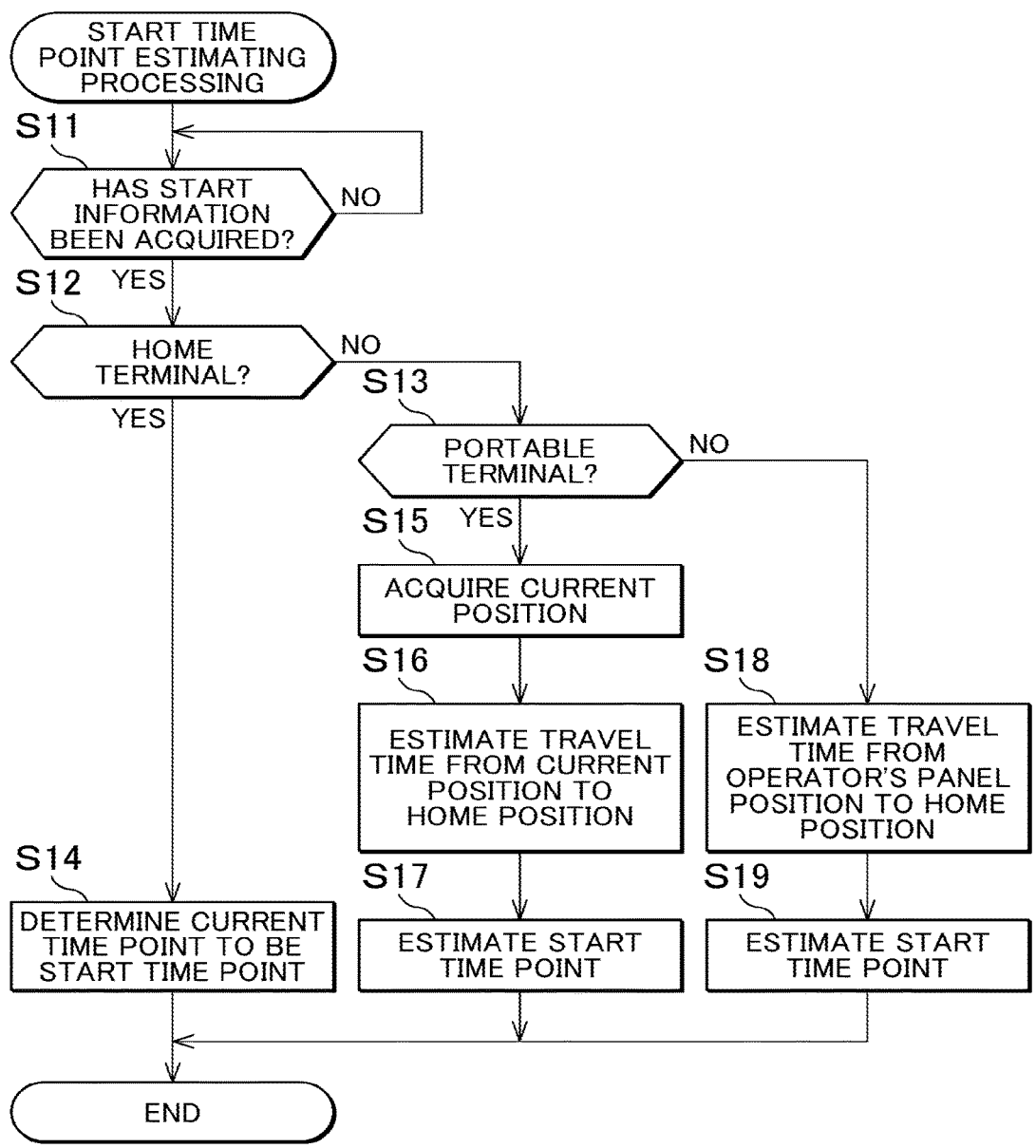
FIG. 8 is a flowchart illustrating processing executed by an operation start time point estimating unit in an operation state acquiring unit in FIG. 4.

As depicted in FIG. 8, the operation start time point estimating unit 55a determines whether start information has been acquired from the operator terminal 13, HP, W. That is, the estimating unit 55a determines whether or not the operator has touched the start button on the operator terminal 13, HP, W depicted in FIG. 3A. If the start information has been acquired from the operator terminal 13, HP, W, the estimating unit 55a determines whether the operated operator terminal is the home terminal HP (S12) or the portable terminal W (S13).

If the operator has operated the home terminal HP (S12: Yes), the estimating unit 55a sets the current time point when the operator touched the start button as a start time point (S14). If the operator has operated the portable terminal W (S12: No→S13: Yes), the estimating unit 55a acquires the position information of the portable terminal W acquired by the position information acquiring unit 54 (S15). The estimating unit 55a subsequently estimates a travel time of the operator based on a standard travel speed of the operators and a distance from the current position of the portable terminal W to the home position P (S16). The standard travel speed of the operators is preset. The estimating unit 55a subsequently estimates the start time point by adding the estimated travel time to the current time point (S17).

If the operator has operated the operator's panel 13 (S12: No→S13: No), the estimating unit 55a estimates the travel time of the operator based on the standard travel speed of the operator and a distance from the position of the operated operator's panel 13 to the home position P (S18). The standard travel speed of the operator is preset. The estimating unit 55a subsequently estimates the start time point by adding the estimated travel time to the current time point (S19).

Figure 9:
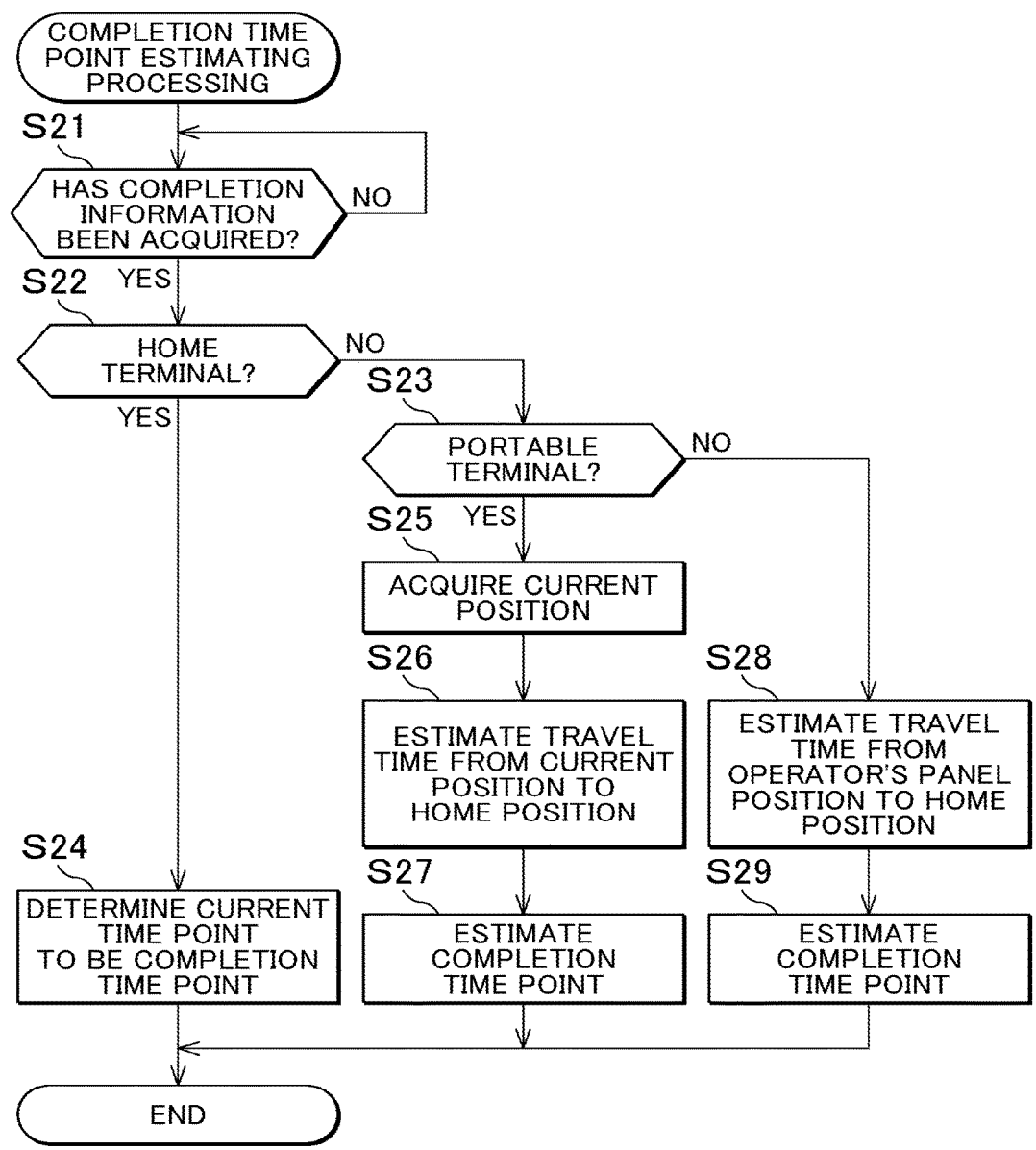
FIG. 9 is a flowchart illustrating processing executed by an operation completion time point estimating unit in the operation state acquiring unit in FIG. 4.

As depicted in FIG. 9, the operation completion time point estimating unit 55b determines whether completion information has been acquired from the operator terminals 13, HP, W (S21). That is, the estimating unit 55b determines whether or not the operator has touched the completion button on the operator terminal 13, HP, W depicted in FIG. 3B. If the completion information has been acquired from the operator terminal 13, HP, W, the estimating unit 55b determines whether the operated operator terminal is the home terminal HP (S22) or the portable terminal W (S23).

If the operator has operated the home terminal HP (S22: Yes), the estimating unit 55b sets the current time point when the operator has touched the completion button to be a completion time point (S24). If the operator has operated the portable terminal W (S22: No→S23: Yes), the estimating unit 55b acquires position information of the portable terminal W acquired by the position information acquiring unit 54 (S25). The estimating unit 55b subsequently estimates the travel time of the operator based on the standard travel speed of the operators and the distance from the current position of the portable terminal W to the home position P (S26). The estimating unit 55b then estimates the completion time point by adding the estimated travel time to the current time point (S27).

If the operator has operated the operator's panel 13 (S22: No→S23: No), the estimating unit 55b estimates the travel time of the operator based on the standard travel speed of the operators and the distance from the position of the operated operator's panel 13 to the home position P (S28). The estimating unit 55b then estimates the completion time point by adding the estimated travel time to the current time point (S29).

With reference to FIG. 10, processing will be described which is executed by the all-operator state acquiring unit 59 and used for the function to indicate the next operation to the operator, which function is provided by the management apparatus M. The all-operator state acquiring unit 59 receives information on the executing operator acquired from the executing operator acquiring unit 53 and information on the operation state acquired by the operation state acquiring unit 55. Specifically, as depicted in FIG. 10, the all-operator state acquiring unit 59 has, for each operator, the time point of the input of operation start information, the estimated time point of operation start with reference to the home position (the estimated time point of HP operation start), the time point of the input of operation completion information, and the estimated time point of operation completion with reference to the home position (the estimated time point of HP operation completion).

The all-operator state acquiring unit 59 has information indicating whether the operator is performing the operation or is in an operation completion state. The all-operator state acquiring unit 59 determines that the operator is performing the operation if the operator has started the operation but has not completed the operation, and determines that the operator is in the operation completion state if the operator has completed the operation and has not started the next operation.

The all-operator state acquiring unit 59 further has a predicted time point when the operator performing the operation is predicted to complete the indicated operation. At this time, the all-operator state acquiring unit 59 calculates the predicted time point taking into account the standard operation time varying depending on the operation type, by acquiring the operation type indicated to the operator by the next-operation determining unit 60.

In FIG. 10, the operator A is performing the operation, and the time point of input of operation start is the same as the estimated time point of HP operation start. In other words, the operator A is performing an operation for operation start using the home terminal HP. The operator C is also performing an operation for operation completion using the home terminal HP. For the operator D, the time point of input of operation start is different from the estimated time point of HP operation start. In other words, the operator D is performing the operation using the portable terminal W or the operator's panel 13. This also applies to the operator B.

Figure 11:
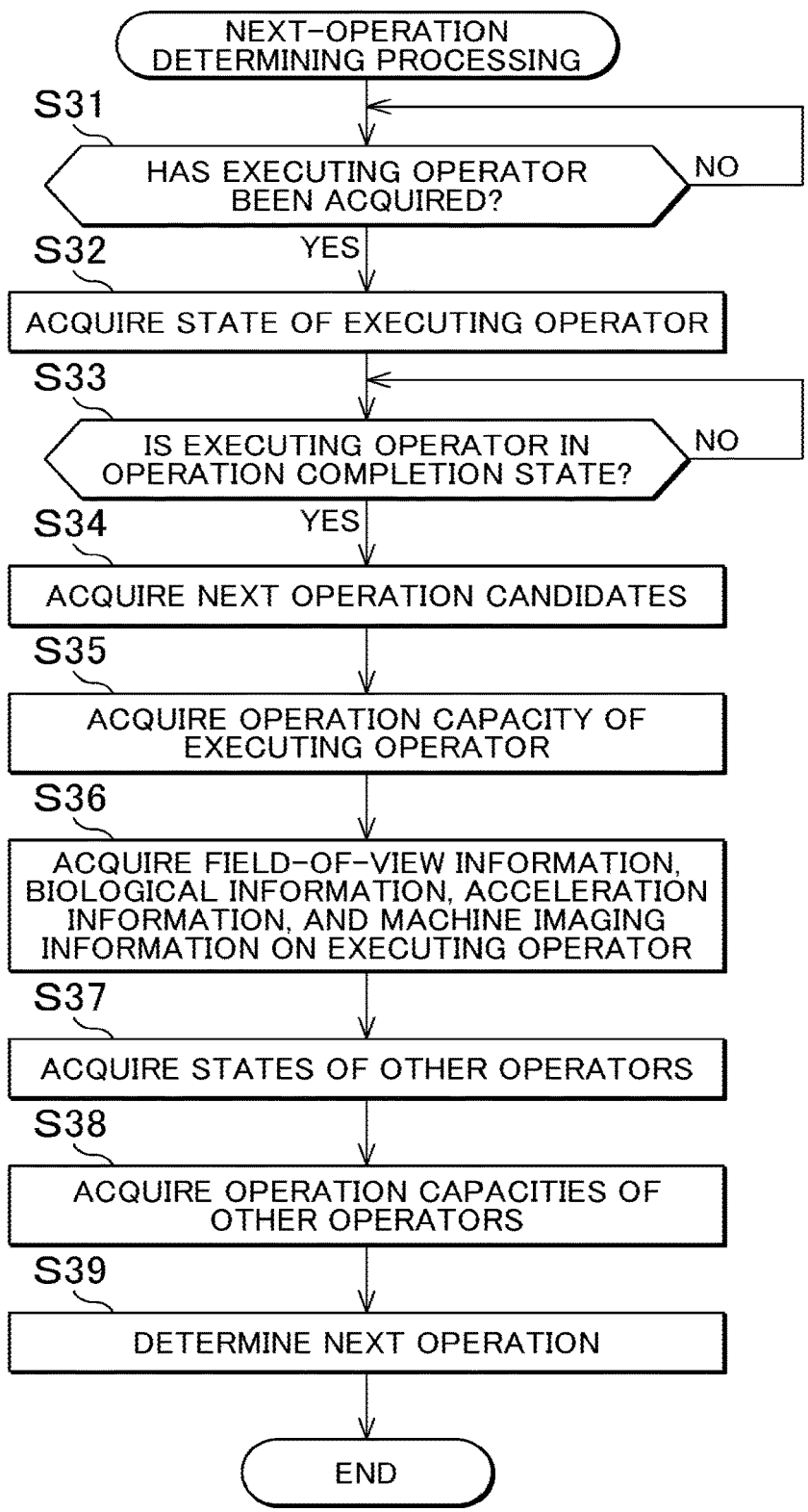
FIG. 11 is a flowchart illustrating processing executed by a next-operation determining unit in FIG. 4.

Now, the function to indicate the next operation to the operator, which function is provided by the management apparatus M, will be described with reference to FIG. 3A, FIG. 4, and FIG. 11. The function to indicate the next operation to the operator includes the process plan storage unit 51, the machine state acquiring unit 52, the executing operator acquiring unit 53, the position information acquiring unit 54, the operation state acquiring unit 55, the capacity database 57, the next-operation candidate extracting unit 58, the all-operator state acquiring unit 59, the next-operation determining unit 60, the machine imaging information acquiring unit 71, the field-of-view information acquiring unit 72, the biological-information acquiring unit 73, and the acceleration information acquiring unit 74.

As depicted in FIG. 4, the next-operation candidate extracting unit 58 acquires the current conditions of the processing machines MC1 to MC8 acquired by the machine state acquiring unit 52 and the relevant process plan stored in the process plan storage unit 51. The next-operation candidate extracting unit 58 extracts a candidate for the next operation to be performed by the operator based on the current conditions of the processing machines MC1 to MC8 and the process plan. The next operation candidate corresponds to an operation currently in need to be performed by the operator in the facility 1 as a whole. The next operation candidates are displayed in the candidate section 42 of the operator terminal 13, HP, W in FIG. 3A. When extracting a plurality of next operation candidates, the next-operation candidate extracting unit 58 determines the priorities of the next operation candidates. The priorities are also displayed in the candidate section 42 in FIG. 32A.

Then, the next-operation determining unit 60 determines the next operation for the predetermined operator. Processing executed by the next-operation determining unit 60 will be described with reference to FIG. 11. The determining unit 60 determines whether or not the executing operator has been acquired from the executing operator acquiring unit 53 (S31). In other words, the determining unit 60 determines that the executing operator has been acquired when any of the operators touches the operator button on the operator terminal 13, HP, W.

The determining unit 60 does not proceed with the processing unless the executing operator has been acquired (S31: No). Upon acquiring the executing operator (S31: Yes), the determining unit 60 acquires the state of the executing operator from the all-operator state acquiring unit 59 (S32) The determining unit 60 determines whether or not the executing operator is in the operation completion state (S33). If the operator is not in the operation completion state (S33: No), the determining unit 60 returns to S32 to repeat the processing.

If the operator is in the operation completion state (S33: Yes), the determining unit 60 acquires the next operation candidates extracted by the next-operation candidate extracting unit 58 (S34). The determining unit 60 subsequently acquires the operation capacity of the executing operator from the capacity database 57 (S35). The determining unit 60 then acquires information from the machine imaging information acquiring unit 71, the field-of-view information acquiring unit 72, the biological-information acquiring unit 73, and the acceleration information acquiring unit 74 (S36).

The determining unit 60 subsequently acquires the states of the other operators from the all-operator state acquiring unit 59 (S37). For example, the determining unit 60 acquires information indicating whether any other operator is currently ready to start the operation or soon completes the operation. The determining unit 60 subsequently acquires the operation capacities of the other operators from the capacity database 57 (S38).

Finally, the determining unit 60 determines the next operation for the executing operator based on the next operation candidates, the operation capacity of the executing operator, the states of the other operators, and the operation capacities of the other operators (S39). The determining unit 60 can determine the state of the executing operator and the states of the other operators in further detail utilizing machine imaging information, field-of-view information, biological information, and acceleration information. The determining unit 60 also uses these pieces of information to determine the next operation for the executing operator.

Specifically, the determining unit 60 determines whether or not the executing operator can perform a next operation candidate at a higher priority, and determines a candidate for the next operation that can be performed by the executing operator as the next operation for the executing operator. However, if any other operator is also ready to start the operation, the next operation for the executing operator is determined taking into account the operation capacity of the executing operator and the operation capacities of the other operators.

For example, as depicted in FIG. 7A, the operator A can perform all the types of operations, whereas the operators B, C, D can perform only some types of operations. When the next operation for the operator A is determined, assume that the operator B is currently ready to start the next operation or will soon get ready to start the next operation. At this time, if the type of the operation that can be performed by both the operator A and the operator B is a next operation candidate at a higher priority, the determining unit 60 determines a next operation candidate at a lower priority to be the next operation for the operator A. The next operation candidate at the higher priority can be indicated as the next operation for the operator B but the next operation candidate at the lower priority may not be able to be indicated as the next operation for the operator B. The next operation candidates can be efficiently performed by determining the next operation candidate at the higher priority to be the next operation for the operator B and determining the next operation candidate at the lower priority to be the next operation for the operator A.

However, the process plan is taken into account when the next operation candidate at the lower priority is determined to be the next operation. If the process plan may be delayed when the next operation candidate at the lower priority is determined to be the next operation, it is still preferable to determine the next operation candidate at the higher priority to be the next operation instead of determining the next operation candidate at the lower priority to be the next operation.

The next-operation determining unit 60 may determine the next operation for an operator with an operation capacity lower than the standard capacity if the process plan will not be delayed. In FIG. 5, the gaps between the frames represent time periods when no processing is executed by the processing machines MC1 to MC8 and no operation is performed by the operators. In other words, the next-operation determining unit 60 utilizes the time gaps to set the operation time longer than the standard operation time to provide time to spare so as to enable operators with low operation capacities to be educated.

If the determining unit 60 can determine that the executing operator is in bad physical condition based on the biological information on the executing operator, the next operation for the operator is determined taking into account a possible reduced operation capacity compared to the operation capacity in the normal state. The determining unit 60 can also recognize the motion of the operator based on the imaging information from the machine imaging apparatus, field-of-view information, and acceleration information. For example, if the operator is injured and the motion of a part of the operator's body is dragging compared to the motion of the same part in the normal state, the next operation for the operator is determined taking into account a possible reduced operation capacity compared to the operation capacity in the normal state. In other words, the next operation is determined so as to avoid a delay, based on the process plan, with a possible reduced operation capacity as described above taken into account.

The facility 1 serving as the operation order system according to the above-described embodiment is directed to the facility 1 including the processing machines MC1 to MC8 and gives operation orders to the operators handling the processing machines MC1 to MC8. The facility 1 serving as an operation order system includes the management apparatus M that manages the processing executed by the processing machines MC1 to MC8 and the operations performed on the processing machines MC1 to MC8 by the operators and that determines the next operation for each operator based on the operation state of the operator, and the portable terminals W that can be carried by the operators and via each of which the corresponding operator can input the operation state of the operator so that the portable terminal W transmits the input operation state to the management apparatus M through wireless communication. Each of the portable terminals W receives the next operation from the management apparatus M through wireless communication and displays the received next operation. The portable terminal W transmits, as the operation state, the operation start information or the operation completion information input by the operator, on the assumption that the operator has started or completed the operation at the home position P in the facility 1.

In the above-described operation order system, when the operator inputs the operation start information or the operation completion information, the determination of start or completion of the operation is not based on the position where the portable terminal W is present, that is, the position where the operator is present. In other words, when the operator inputs the operation start information or the operation completion information via the portable terminal W, the management apparatus M estimates the operation start state or the operation completion state with reference to the home position P rather than with reference to the position where the portable terminal W is present. In other words, when the operator is located away from the home position P, the operation is determined to have been started or completed later than the time point of the input via the portable terminal W. Therefore, more efficient operation orders can be achieved depending on the position of the operator.

The portable terminal W further has an acceleration sensor 36 that detects acceleration of a predetermined site (for example, the arm, the head, or the abdomen) of each operator to transmit the detected information to the management apparatus M through wireless communication. Consequently, the management apparatus M can determine the situation of the operator by detecting the motion of the operator. The management apparatus M can determine the next operation in accordance with the motion of the operator.

The portable terminal W further has a sensor 35 that detects biological information on each operator to transmit the detected information to the management apparatus M through wireless communication. Consequently, the management apparatus M can determine the physical condition and the like of the operator by detecting the biological information on the operator. The management apparatus M can determine the next operation in accordance with the biological information on the operator.

The portable terminal W further has a portable imaging apparatus 34 that images the field of view of each operator to transmit imaging information to the management apparatus M through wireless communication. Consequently, the management apparatus M can determine the situation of the operator by imaging the surroundings of the operator. The management apparatus M can determine the next operation in accordance with the surroundings of the operator.

The operation state acquiring unit 55 includes the operation start time estimating unit 55a that estimates, when the operation start information is input via the portable terminal W, the start time point based on the time point of the input and the distance from the position of the portable terminal W at the time of the input to the home position P, and the operation completion time estimating unit 55b that estimates, when the operation completion information is input via the portable terminal W, the completion time point based on the time point of the input and the distance from the position of the portable terminal W at the time of the input to the home position P. The next-operation determining unit 60 determines the next operation for the operator based on the estimated start time point and the completion time point.

When the operator inputs the start or completion of the operation by the operator using the portable terminal W, the operation state acquiring unit 55 estimates the start time point or the completion time point taking into account the position of the portable terminal W and the distance from the portable terminal W to the home position P. Therefore, when the operator is present at a position different from the home position P, even if the operator inputs the operation start or completion via the portable terminal W, the operation state acquiring unit 55 can reliably acquire the operation start time point or the operation completion time point with reference to the home position P.

What is claimed is:

1. An operation order system that is directed to a facility including a plurality of processing machines and that gives operation orders to an operator handling the processing machines, the operation order system comprising:
   a management apparatus that manages processing executed by the processing machines and operations performed by the operator handling the processing machines and that determines a next operation for the operator based on an operation state of the operator; and
   a portable terminal that is enabled to be carried by the operator and via which the operator is enabled to input the operation state of the operator so that the portable terminal transmits the input operation state to the management apparatus through wireless communication, the portable terminal receiving the next operation from the management apparatus through wireless communication and displaying the received next operation, wherein the management apparatus includes an operation state acquiring unit that estimates an operation start state or an operation completion state based on predetermined home position in the facility when the operator inputs operation start information or operation completion information via the portable terminal as the operation state; and a next-operation determining unit that determines a next operation for the operator based on the estimated operation start state or operation completion state.

2. The operation order system according to claim 1, wherein the portable terminal has an acceleration sensor that detects acceleration of a predetermined site of the operator to transmit detected information to the management apparatus through wireless communication.

3. The operation order system according to claim 1, wherein the portable terminal has a sensor that detects biological information on the operator to transmit detected information to the management apparatus through wireless communication.

4. The operation order system according to claim 1, wherein the portable terminal has an imaging apparatus that images a field of view of the operator to transmit imaging information to the management apparatus through wireless communication.

5. The operation order system according to claim 1, wherein the operation state acquiring unit includes:

an operation start time estimating unit that estimates, when the operation start information is input via the portable terminal, a start time point based on a time point of the input and a distance from a position of the portable terminal at a time of the input to the predetermined home position; and an operation completion time estimating unit that estimates, when the operation completion information is input via the portable terminal, a completion time point based on a time point of the input and a distance from the position of the portable terminal at a time of the input to the predetermined home position, and the next-operation determining unit determines the next operation for the operator based on the estimated start time point and the completion time point.

\* \* \* \* \*